(12) United States Patent
Munz et al.

(10) Patent No.: US 7,777,482 B2
(45) Date of Patent: Aug. 17, 2010

(54) JOINING ELEMENT

(75) Inventors: Michael Munz, Ruetlingen (DE);
Helmut Grutzeck, Maehringen (DE);
Johann Wehrmann, Balingen (DE);
Conrad Haeussermann, Trochtelfingen (DE); Klaus Kasten, Reutlingen (DE);
Uwe Schiller, Tuebingen (DE); Konrad Dirscherl, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 10/592,609

(22) PCT Filed: Jan. 10, 2005

(86) PCT No.: PCT/EP2005/050080

§ 371 (c)(1),
(2), (4) Date: Jun. 26, 2007

(87) PCT Pub. No.: WO2005/088267

PCT Pub. Date: Sep. 22, 2005

(65) Prior Publication Data

US 2007/0273367 A1 Nov. 29, 2007

(30) Foreign Application Priority Data

Mar. 10, 2004 (DE) .................. 10 2004 011 591

(51) Int. Cl.
*G01B 7/14* (2006.01)
(52) U.S. Cl. ................ 324/207.2; 324/207.24
(58) Field of Classification Search ........... None
See application file for complete search history.

(56) References Cited

U.S. PATENT DOCUMENTS

| 2,774,890 | A | * | 12/1956 | Semmelman | 333/24.1 |
| 4,532,810 | A | * | 8/1985 | Prinz et al. | 73/717 |
| 4,936,148 | A | * | 6/1990 | Shaw et al. | 73/728 |
| 5,493,216 | A | * | 2/1996 | Asa | 324/207.2 |
| 6,215,299 | B1 | * | 4/2001 | Reynolds et al. | 324/207.2 |
| 6,496,003 | B1 | * | 12/2002 | Okumura et al. | 324/207.24 |
| 6,515,473 | B2 | * | 2/2003 | Pfaffenberger et al. | 324/207.2 |
| 6,515,474 | B1 | * | 2/2003 | Dielschneider et al. | 324/207.24 |
| 6,586,929 | B1 | * | 7/2003 | Luetzow | 324/207.24 |
| 6,823,270 | B1 | | 11/2004 | Roys | |
| 2003/0122641 | A1 | | 7/2003 | Luetzow | |
| 2003/0156920 | A1 | | 8/2003 | Dukart et al. | |
| 2004/0239514 | A1 | | 12/2004 | Takata | |

FOREIGN PATENT DOCUMENTS

| JP | 62036501 | 2/1987 |
| JP | 64010638 | 1/1989 |
| JP | 6-88702 | 3/1994 |
| JP | 7-105809 | 4/1995 |
| JP | 10-185621 | 7/1998 |
| JP | 11160010 | 6/1999 |
| JP | 201050703 | 2/2001 |

* cited by examiner

*Primary Examiner*—Jay M Patidar
(74) *Attorney, Agent, or Firm*—Kenyon & Kenyon LLP

(57) ABSTRACT

A joining element is proposed which, for force measurement, senses a relative motion between a magnet system and a magnet sensor apparatus. The magnet system is disposed with respect to the magnet sensor apparatus in such a way that a component of the magnetic field perpendicular to the relative motion is linearized.

9 Claims, 7 Drawing Sheets

JOINING ELEMENT

FIELD OF THE INVENTION

The invention proceeds from a joining element.

BACKGROUND INFORMATION

German Published Patent Application No. 101 11 020 discloses a joining element of the species in which the relative motion between a magnet system and a magnet sensor apparatus is used for force measurement. The magnet system is preferably a permanent magnet, a Hall sensor element, which can be disposed symmetrically or centeredly with respect to the permanent magnet, being used as the magnet sensor apparatus.

SUMMARY OF THE INVENTION

The joining element according to the present invention has, in contrast thereto, the advantage that the magnet system is now disposed with respect to the magnet sensor apparatus in such a way that a component of the magnetic field perpendicular to the relative motion between the magnet system and the magnet sensor apparatus is linearized. This improves the measurement of the magnetic field, and therefore the force measurement. An optimized symmetry and strength of the magnetic field is thus achieved, with minimum installation space. In particular, an increased magnetic stroke length per unit of relative motion is thereby attained, thus bringing about a greater magnetic field change as a function of location. The consequence of this is that over the measurement range, in the context of a reduced mechanical deflection, an increased linear output signal for the magnetic field sensor apparatus is achieved. This improves, for example, insensitivity to interference effects such as moments and transverse forces.

An increased magnetic stroke length as well as a large magnetic field change in a preferred spatial direction allow a further decrease in the size of the joining element, and thus an improvement in continuous load-bearing capacity.

What is critical is the relative motion between the magnet system and the magnetic field sensor apparatus. It is immaterial in this context whether the magnet system or magnetic field sensor is stationary, or the magnet system or magnetic field sensor moves, or if both, i.e. the magnet system and the magnetic field sensor, move. In general, the near magnetic field of the magnet is measured here. As a result of the modification and configuration of the far field, the shape and strength or extent of the near field are also optimized, and an improvement in the sensor signal is thereby obtained. The far field is adjusted or optimized by way of the size, geometry, and position of the magnets with respect to one another.

The magnet and sensor positions are exchangeable depending on the embodiment, and disposed along a flexural beam. The goal is to achieve a maximum relative stroke length between magnet and sensor, with minimum influence from moments and transverse forces.

It is particularly advantageous that at least one pole transition, i.e. the region between the north and south pole, of a magnet of the magnet system has a recess opposite the magnetic field sensor apparatus. This recess can be, for example, a notch, a gap, a slit, or a depression of some other kind at the pole transition. This recess is small in terms of dimensions as compared with the geometrical size of the respective magnet. The magnetic field thus generated has an elevated field strength around the depression edges, and a symmetrical field is generated by the shape of the depression. The result thereof is that the component of the field perpendicular to the deflection direction exhibits improved linearity.

It is additionally advantageous that at least two pole shoes are provided on the magnet system, preferably a single-magnet system, and bring about a stronger magnetic field because the magnetic field facing away from the magnet sensor apparatus is now also deflected by the pole shoes to the measurement point between the pole shoes. The conformation of the pole shoes defines, among other things, the symmetry and shape of the magnetic field at the measurement point located between the pole shoes. The component of the field perpendicular to the deflection direction exhibits improved linearity for this reason as well.

It is furthermore advantageous that the surface of the magnet system is shaped in such a way that the surface tapers toward the magnet sensor apparatus. Optimized shaping of the magnetic field is thereby achieved. As a result of the corresponding shaping of the surface of the magnet, the magnetic field at the measurement point is optimized in terms of shape and strength for the measured signal, and insensitivity to moments and transverse forces is enhanced.

It is additionally advantageous that the magnet system has magnets located opposite one another, with like magnetic poles placed opposite one another, i.e. south pole opposite south pole and north pole opposite north pole. With a multiple-magnet system of this kind, the magnetic field shape and size can be adjusted, for example, by way of the spacing and position of the magnets. The position-sensitive magnetic field change can be measured between and alongside the magnets. By selection of the sensor position, measurement can occur in the region of maximum magnetic field gradients and at a point of minimum interference effects. It is also possible, however, for unlike magnetic poles to be placed opposite one another. This allows establishment of a controlled magnetic field gradient, for example in order to obtain a preferred direction having elevated sensitivity.

Lastly, it is also advantageous that a pole transition of one magnet is placed opposite a pole of another magnet. The result is to generate a definedly asymmetrical field that makes possible a multiple-part measurement region. An elevated resolution can thus be achieved in a desired measurement region, and a reduced resolution outside that desired measurement region. A preferred direction of the measurement region can also be established. Alternatively, it is possible to configure a multiple-magnet system of this kind with a symmetrical field by way of a magnet disposition of south pole—north pole—south pole, opposite which a north pole is placed, or vice versa. The shape and strength of the magnetic field can be adjusted by way of the size of the magnetic poles involved and their spacing from one another.

DETAILED DESCRIPTION

Force measuring systems are increasingly being used for the characterization of objects on vehicle seats. A joining element, which is used instead of a bolt or screw to attach a vehicle seat and at the same time measures the force being exerted on the seat, is connected to a control device for the activation of personal protection means in order to prevent the triggering of, for example, an airbag when a seat is unoccupied. With the use of multiple joining elements on one vehicle seat, it is also possible to characterize more accurately, specifically by way of the load distribution, an object that is located on the vehicle seat. It has proven to be advantageous in terms of the joining element to use the relative motion between a magnet system and a magnetic field sensor, preferably a Hall sensor, for measuring force in the joining element.

It is now proposed according to the present invention to optimize this disposition in the joining element between the magnet system and magnetic field sensor apparatus in such a way that a component of the magnetic field perpendicular to the relative motion is linearized. This makes possible a simple evaluation of the measurement results.

Figure 4:
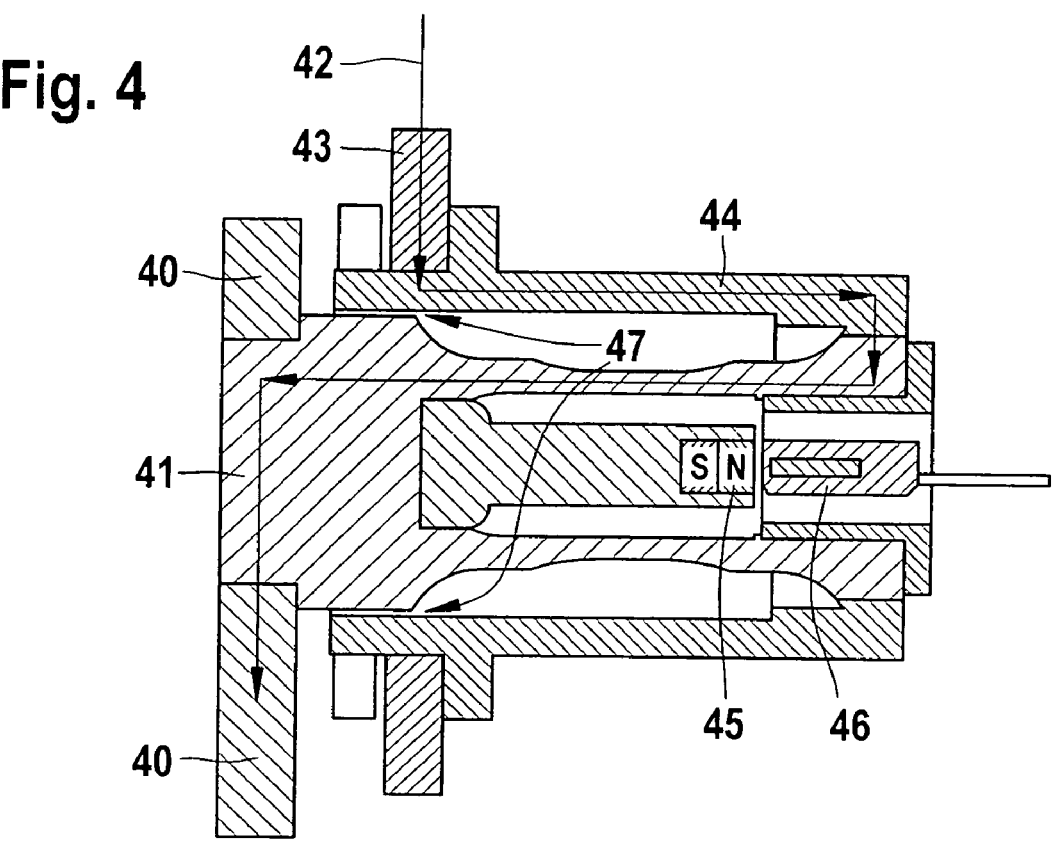
FIG. 4 shows the joining element.

FIG. 4 explains how the disposition of the magnetic field sensor apparatus and the magnetic field system is disposed in a joining element, and how force is measured. Joining element 41 is permanently built into a retainer 40 that is installed on the chassis of the vehicle. At the other end, joining element 41 is joined to the seat, indicated here by receptacle 43. Joining element 41 thus receives, via receptacle 43, the weight force 42 exerted on the seat. Weight force 42 is introduced through sleeve 44 into the body of joining element 41 and is then carried off via retainer 40. This force results in a displacement between flexural beam 45 and Hall sensor 46 that is mounted in the housing of joining element 41. The weight load on the seat can be determined from that displacement. Air gaps 47 are provided here as overload protection.

The seat force sensor is thus made up of an internal flexural element and an external sleeve that is welded at one end in sealed and fixed fashion. This weld is therefore made to retainer 40. This assemblage is the active element of the sensor. Inside the sensor, the displacement as a result of force action is sensed by a Hall sensor. The signal of Hall sensor 46 is intended to be conveyed to a housing mounted at the periphery of the bolt, where signal processing takes place on a circuit board. The processed signal is then conveyed to a connector interface. At this, the signal is conveyed via a mating connector and wiring harness in the vehicle to the control device for activating personal protection means. Because the force is converted into a linear displacement, and Hall sensor 46 converts that displacement into a signal, any motion or displacement of Hall sensor 46 or its retaining apparatus as a result of external force influences must be avoided, since that would result in a misinterpretation or incorrect measurement.

Figure 1A:
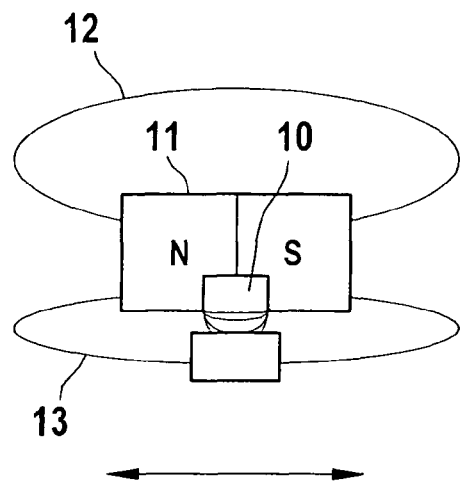
FIG. 1 shows various configurations of a single-magnet system.
Figure 1B:
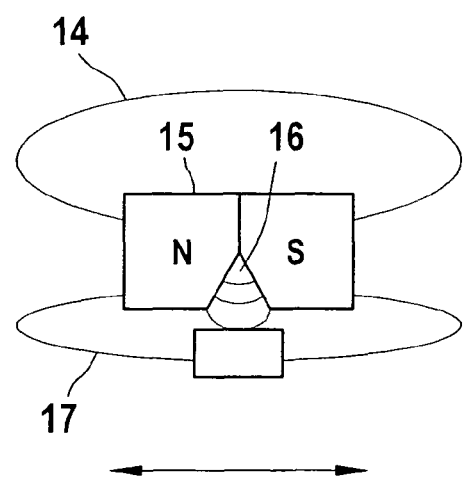
Figure 1C:
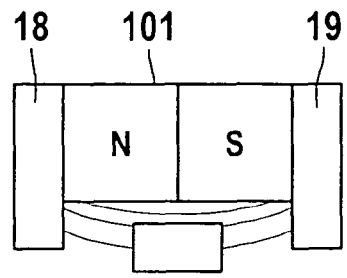
Figure 2A:
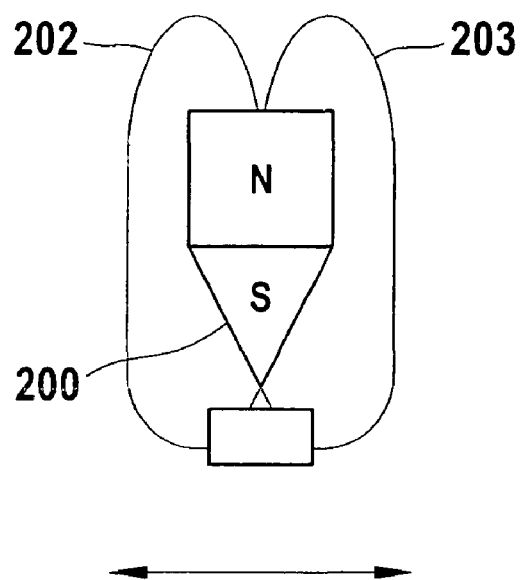
FIG. 2 shows single-magnet systems having a specially shaped surface.
Figure 2B:
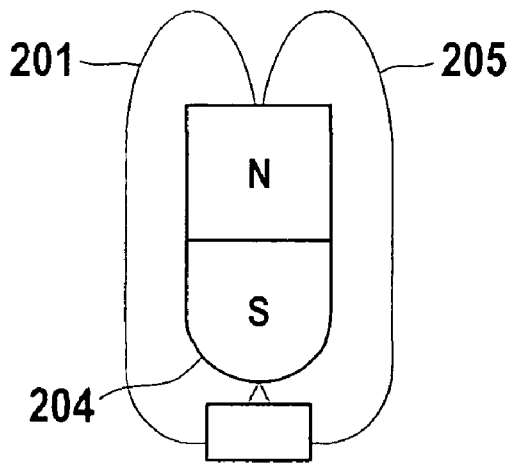
Figure 2C:
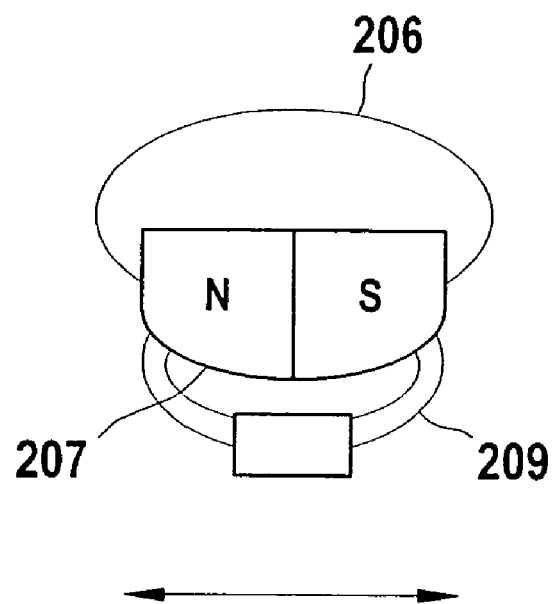
Figure 2D:
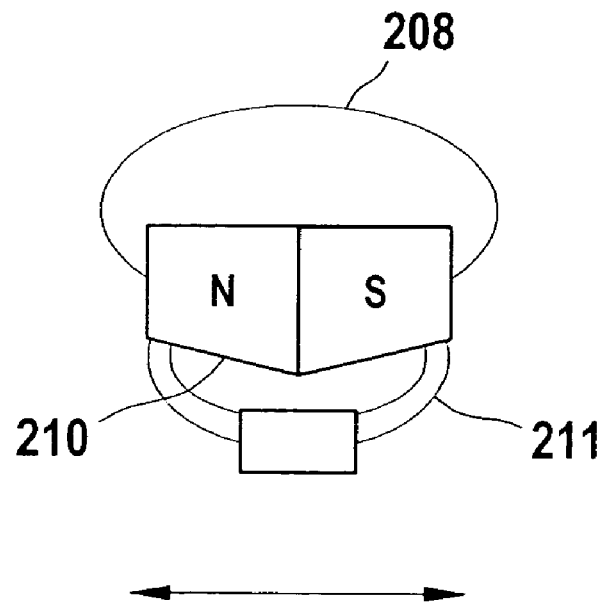

FIG. 1 shows single-magnet systems, in versions a, b, and c, that are embodied according to the present invention. FIG. 1a shows a magnet 11 having a recess 10 opposite the Hall magnetic field sensor apparatus, the deflection of the Hall magnetic field sensor apparatus occurring in a transverse direction as indicated here. Magnet 11 generates a magnetic field 13 facing toward the Hall magnetic field sensor apparatus, and a magnetic field 12 facing away from the magnetic field sensor apparatus. The depression is small in terms of dimensions as compared with the geometric size of magnet 11. The magnetic field thus generated has an elevated field strength around the depression edges. FIG. 1b shows a variant, a notch tapering to a point being provided here as the recess. Magnet 15 once again has a magnetic field 17 facing toward the Hall magnetic field sensor apparatus and a magnetic field 14 facing away, notch 16 generating a symmetrical magnetic field. FIG. 1c describes an alternative. Here magnet 101 is flanked by pole shoes 18 and 19. The effect of the pole shoes is that a stronger magnetic field is generated toward the Hall magnetic field sensor apparatus. This is brought about by the fact that the rearward magnetic field is deflected by the pole shoes to the measurement point located between the pole shoes. The conformation of the pole shoes defines, among other things, the symmetry and shape of the magnetic field at the measurement point that lies between the pole shoes. All three examples a, b, and c result in an improved linearity of the magnetic field perpendicular to the deflection direction.

FIG. 2 shows four exemplifying embodiments in which the shape of the magnet is configured in such a way that the surface of the magnet tapers toward the Hall magnetic field sensor apparatus. In FIG. 2a, the south pole of magnet 200 is shaped so as to taper to a point toward the Hall magnetic field sensor apparatus. Magnetic field 202 or 203 is thereby correspondingly optimized. FIG. 2b shows an alternative; south pole 204 is now rounded toward the Hall magnetic field sensor apparatus. Magnetic field 201, 205 is correspondingly optimized as a result of this as well. FIG. 2c shows a further alternative; the north and south poles now have their pole transition facing toward the Hall magnetic sensor apparatus. The facing side is rounded here as well, as depicted by contour 207. Magnetic field 209 is thereby correspondingly optimized. Rearward magnetic field 206 plays no part here. Such is also the case in example 2d, where rearward magnetic field 208 is not critical, but once again a conformation symmetrical with respect to the pole transition of magnetic 210 was implemented. Here the poles taper to a point toward the Hall magnetic field sensor apparatus at the pole transition, so that magnetic field 211 is correspondingly optimized. By way of a radius or angle at the pole surfaces, the magnetic field geometry and strength are optimized so that a correspondingly higher gain, i.e. amplification, is achieved. A larger usable signal is attained by optimizing the magnetic field in the measurement direction. This reduces the influence of the signal from the non-measurement direction, thereby (among other effects) also increasing the insensitivity of the measured signal to moments and transverse forces.

Figure 3A:
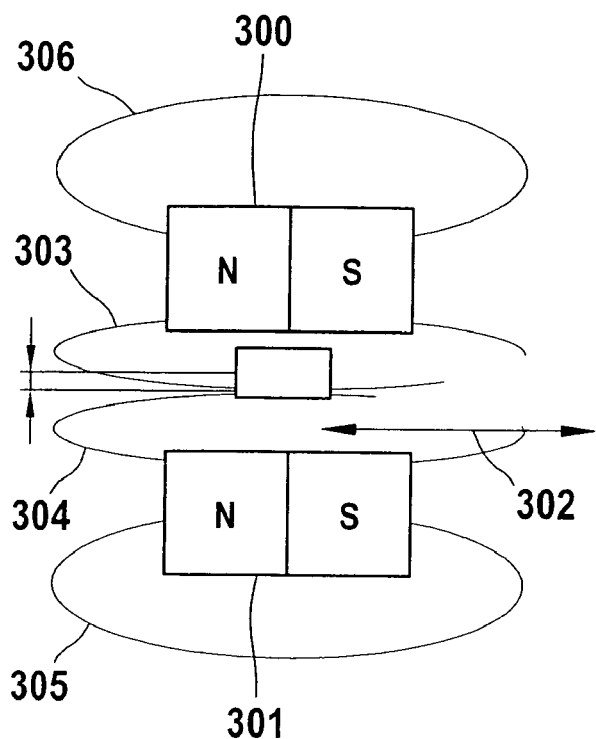
FIG. 3 shows exemplifying embodiments for multiple-magnet systems in which like poles are placed opposite one another.
Figure 3B:
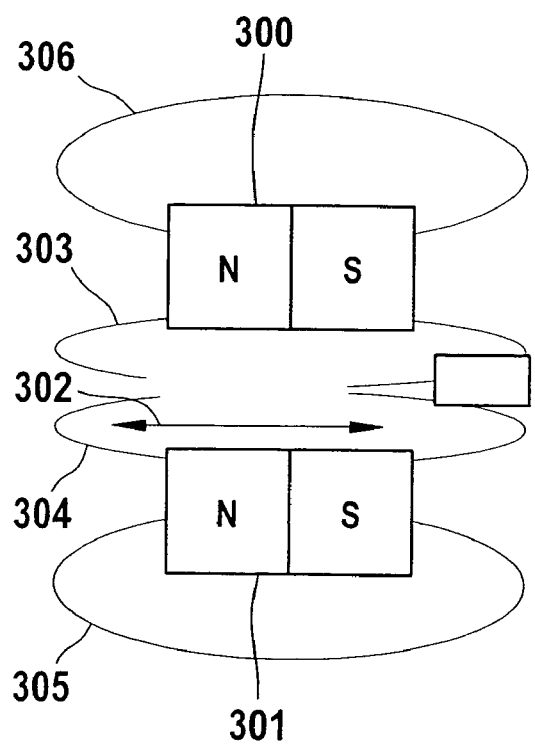
Figure 3C:
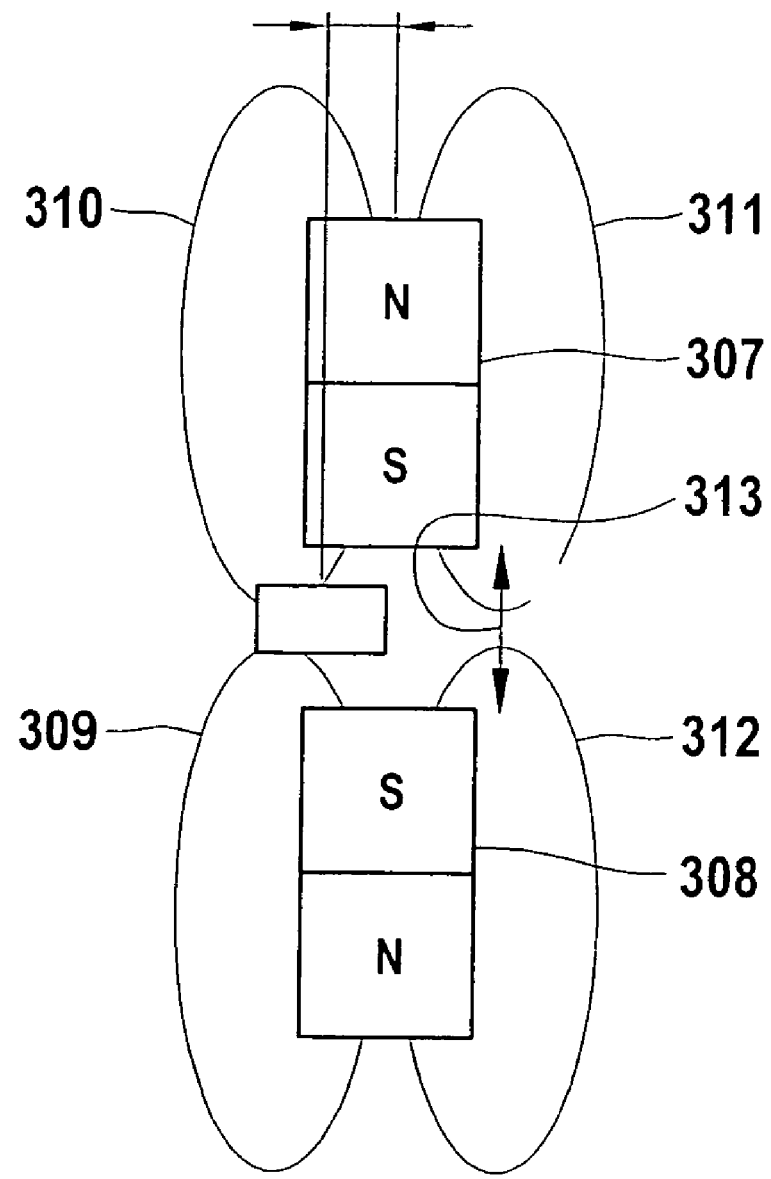

FIG. 3 shows three examples of multiple-magnet systems, the Hall magnetic field sensor apparatus being located in the region between the two magnets. FIG. 3a shows a two-magnet system in which the poles of the two magnets 300 and 301, specifically the like poles, are placed opposite one another. The magnetic field of the two poles 300, 301 is thereby correspondingly shaped, as indicated by magnetic field lines 303, 304, 305, and 306. Here the Hall magnetic field sensor apparatus is movable in the measurement direction, i.e. once again transversely, as indicated by arrow 302. In addition, the Hall magnetic field sensor apparatus is disposed off-center from the field. This allows measurement to occur in the region of maximum magnetic field gradients and at a point of minimum interference. FIG. 3b shows a variant of this. The Hall magnetic field sensor apparatus is now not directly between the two magnets 300 and 201, but somewhat outside. With a multiple-magnet system of this kind, the magnetic field shape and strength can be adjusted to one another, for example, by way of spacing and position. The position-dependent magnetic field change can be measured between the magnets as in FIG. 3a and also FIG. 3c, and alongside the magnet. FIG. 3c shows a variant; here the two magnets 307 and 308 are disposed facing one another in terms of the south pole. The north poles are located respectively behind them. The magnetic field is then formed as here by magnetic field lines 309, 310, 311, and 312. The measurement direction is indicated here in vertical direction 313. Here as well, the Hall magnetic field sensor apparatus is located slightly off-center from the field. "Off-center" means that the measurement point is located outside the geometric center between the magnets. For magnets of equal size/strength, a magnetic field sink (=zero or minimum field) is located at the exact geometric center. This is not suitable as a measurement point. Slightly off-center, however, the magnetic field gradient is highest and this is therefore a preferred measurement point, since small mechanical deflections (relative motions of the Hall magnet system) produce large signal changes.

Figure 5:
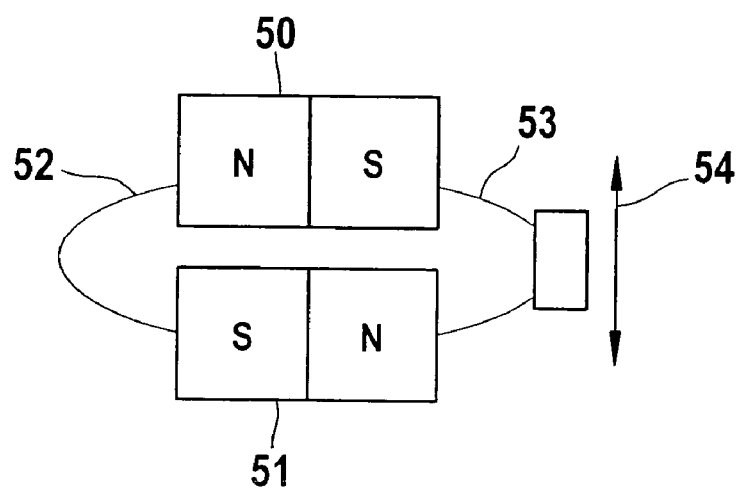
FIG. 5 shows a further multiple-magnet system.

FIG. 5 shows a two-magnet system in which the two magnets 50 and 51 are placed with their respective unlike poles opposite. Magnetic field 52 and 53 is thereby shaped, the Hall magnetic field sensor apparatus being located outside the region between magnets 50 and 51 and moving in the vertical direction, as indicated by arrow 54. This is the extreme variant of FIG. 1a(b), with a gap between the magnetic poles. This is discussed again here because two separate magnets are used.

Figure 6A:
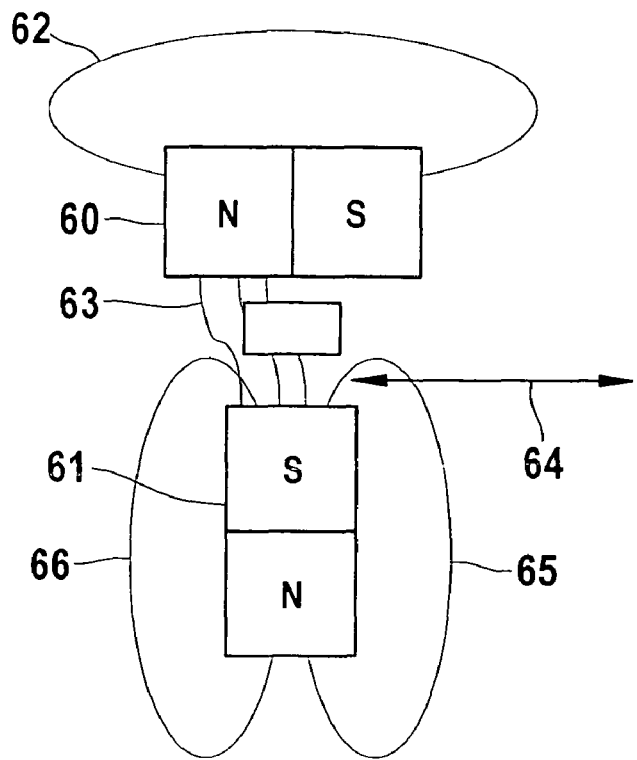
FIG. 6 shows further multiple-magnet systems.

FIG. 6a shows a multiple-magnet system having one magnet 60 opposite whose pole transition a magnet 61 is disposed. The Hall magnetic field sensor apparatus, which here once again deflects horizontally, is disposed between the two magnets 60 and 61. The resulting magnetic field is indicated by field lines 62, 63, 66, and 65. This disposition generates a definedly asymmetrical field 63 that permits a multiple-part measurement region. It is thereby possible, in particular, to achieve an elevated resolution in a desired measurement region and a decreased resolution outside that desired measurement region. In addition, a preferred direction of the measurement region can be established. A very large magnetic field gradient exists in the N-S (or vice versa) transition region 60. The closer the Hall sensor comes to the N pole, the more homogeneous the field becomes, i.e. the Hall sensor exhibits maximum sensitivity. A preferred direction is thereby obtained, with elevated sensitivity e.g. in one measurement direction.

Figure 6B:
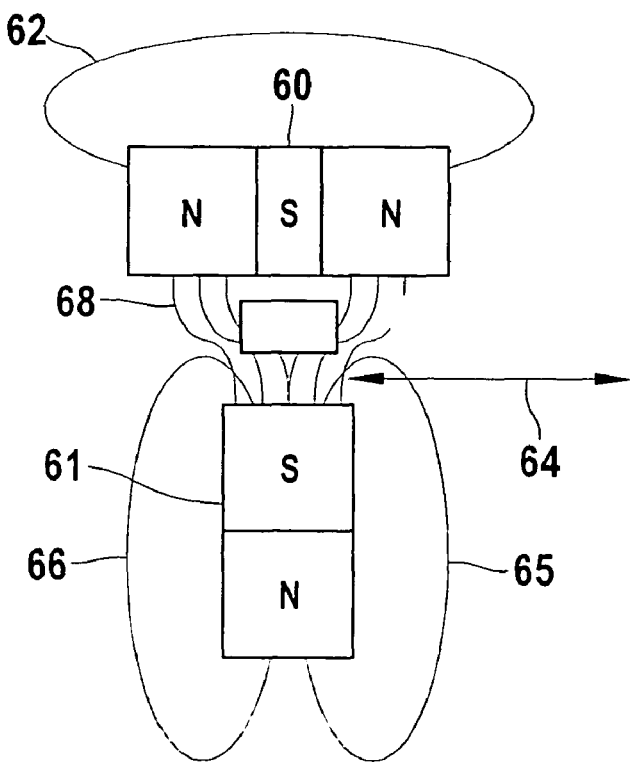

FIG. 6b shows an alternative, now having a symmetrical field 68 since now upper magnet 69 is assembled from three poles, namely a south pole in the middle and two north poles outside in each case. Lower magnet 61 is disposed with its south pole opposite the south pole of magnet 69, although the south pole of lower magnet 61 is somewhat larger than the upper south pole of magnet 69. The resulting magnetic field 68 between the two magnets 69 and 61 is indicated by the field lines. The shape and strength of the magnetic field can be adjusted by way of the size and width of the magnetic poles involved and their spacing from one another.

Single- and multiple-magnet systems are provided with a magnetic field sensor apparatus or a magnet-sensor-magnet disposition that is separately aligned or calibrated. In this context, the magnet-sensor spacing is adjusted by separate installation to the optimum spacing, and immobilized. The calibrated system is then guided laterally through the sleeve and the flexural element and immobilized. The magnets are thus fixedly joined to the sleeve, and the sensor fixedly to the flexural element. The converse disposition, with a magnet in the flexural element and the sensor in the sleeve, is likewise possible. The advantage of this separate calibration of the magnet-sensor-magnet system is both that the pole transitions of the magnets can be aligned with respect to one another and the magnetic field can be precisely adjusted, and also that the sensor element can be optimally oriented in the magnetic field.

What is claimed is:

1. A joining element, comprising:
    a sensing arrangement to sense, with respect to a force measurement, a relative motion between a magnet system and a magnet sensor apparatus;
    wherein the magnet system is disposed with respect to the magnet sensor apparatus so that a component of the magnetic field perpendicular to the relative motion is linearized,
    wherein the magnet system includes an upper magnet assembled from a south pole in the middle and two north poles outside opposite sides of the south pole and a lower magnet disposed with its south pole opposite the south pole of the upper magnet, and
    wherein the south pole of the lower magnet is larger than the south pole of the upper magnet.

2. The joining element as recited in claim 1, wherein a recess is provided at at least one pole transition of the magnet system, opposite the magnetic field sensor apparatus.

3. The joining element as recited in claim 1, wherein at least two pole shoes are provided on the magnet system.

4. The joining element as recited in claim 1, wherein a surface of the magnet system is shaped so that the surface tapers toward the magnet sensor apparatus.

5. The joining element as recited in claim 1, wherein the joining element is permanently built into a retainer that is installed on the chassis of a vehicle.

6. The joining element as recited in claim 1, wherein the magnet sensor is a Hall magnetic field sensor which is movable in the measurement direction and is disposed off-center from the field, so as to allow measurement to occur in the region of maximum magnetic field gradients and at a point of minimum interference.

7. A joining element, comprising:
    a sensing arrangement to sense, with respect to a force measurement, a relative motion between a magnet system and a magnet sensor apparatus;
    wherein the magnet system is disposed with respect to the magnet sensor apparatus so that a component of the magnetic field perpendicular to the relative motion is linearized,
    wherein at least one pole transition of a magnet of the magnet system has a recess opposite the magnetic sensor apparatus,
    wherein at least two pole shoes are provided on the magnet system,
    wherein a surface of the magnet system is shaped so that the surface tapers toward the magnet sensor apparatus, and
    wherein the magnet system includes a first magnet and a second magnet located opposite one another in an arrangement corresponding to magnet poles being placed opposite one another.

8. The joining element as recited in claim 7, wherein the joining element is permanently built into a retainer that is installed on the chassis of a vehicle and used to attach a vehicle seat to the chassis, wherein a weight load on the seat can be determined from the relative motion, wherein the magnet sensor apparatus is a Hall magnetic field sensor which is movable in the measurement direction and is disposed off-center from the field, thereby allowing measurement to occur in the region of maximum magnetic field gradients and at a point of minimum interference, and wherein the first magnet is assembled from a south pole in the middle and two north poles outside opposite sides of the south pole, the second magnet is disposed with its south pole opposite the south pole of the upper magnet, and the south pole of the second magnet is larger than the south pole of the first magnet.

9. A joining element, comprising:
a sensing arrangement to sense, with respect to a force measurement, a relative motion between a magnet system and a magnet sensor apparatus;
wherein the magnet system is disposed with respect to the magnet sensor apparatus so that a component of the magnetic field perpendicular to the relative motion is linearized,
wherein the joining element is permanently built into a retainer that is installed on the chassis of a vehicle and used to attach a vehicle seat to the chassis,
wherein a weight load on the seat can be determined from the relative motion,
wherein the magnet sensor apparatus is a Hall magnetic field sensor which is movable in the measurement direction and is disposed off-center from the field, thereby allowing measurement to occur in the region of maximum magnetic field gradients and at a point of minimum interference,
wherein the magnet system includes an upper magnet assembled from a south pole in the middle and two north poles outside opposite sides of the south pole and a lower magnet disposed with its south pole opposite the south pole of the upper magnet, and
wherein the south pole of the lower magnet is larger than the south pole of the upper magnet.

* * * * *